July 10, 1962
D. PAPAGEORGES
3,043,613
METHOD FOR MOUNTING A PULLEY ON A SHAFT
Filed Dec. 28, 1959
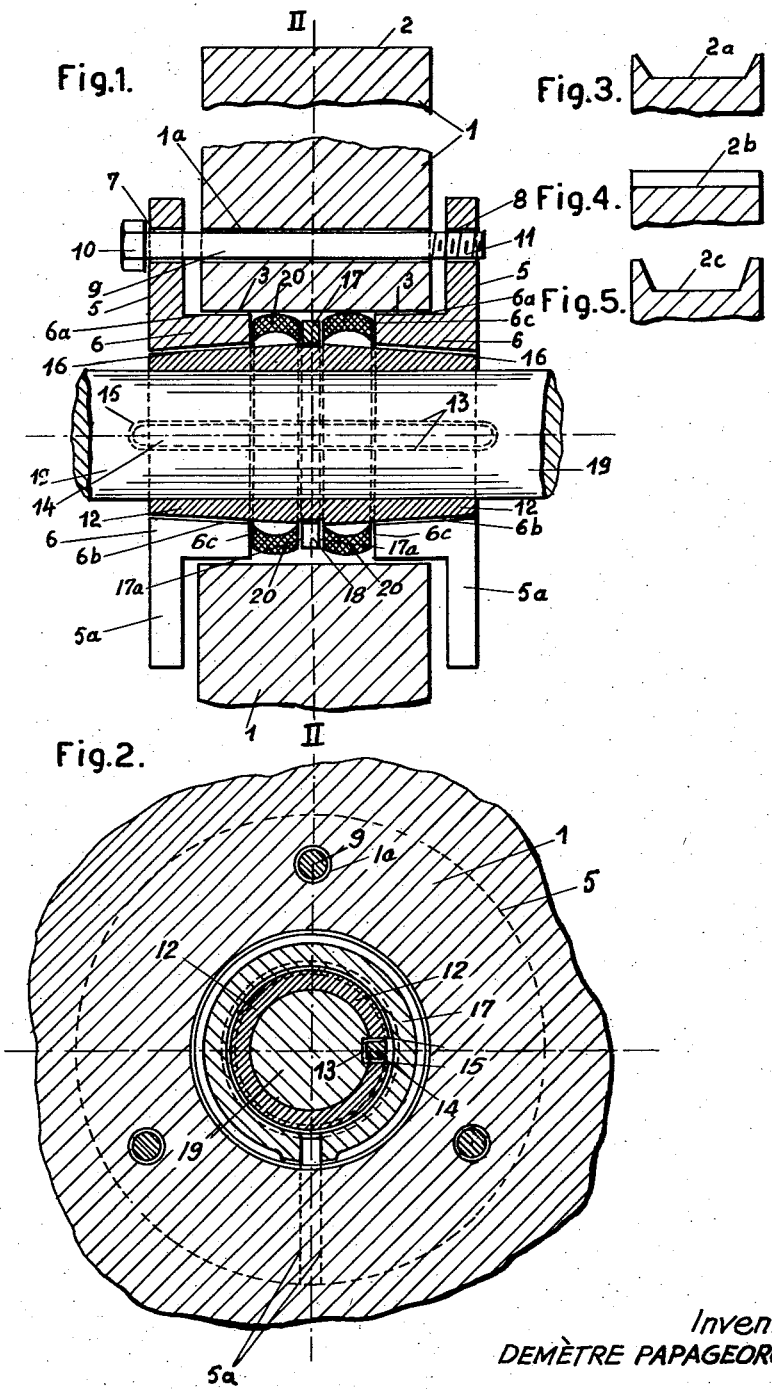
Inventor
DEMÈTRE PAPAGEORGES
By Toulmin & Toulmin
Attorneys

United States Patent Office 3,043,613
Patented July 10, 1962

3,043,613
METHOD FOR MOUNTING A PULLEY ON A SHAFT
Demetre Papageorges, 130 Rue Paradis, Liege, Belgium
Filed Dec. 28, 1959, Ser. No. 862,171
Claims priority, application Belgium Mar. 7, 1959
2 Claims. (Cl. 287—52.06)

The present invention relates to a pulley mounting on a shaft, of very simple design, and more particularly to a pulley mounting which can be easily mounted and dismounted and can be manufactured economically.

To attain this object, the pulley is constructed as follows. On a shaft having a keyway there is mounted a biconical bushing. A key is partially inserted in the keyway in the shaft and partially in a longitudinal opening of the bushing so as to attach the bushing to the shaft. A pair of sleeves surrounds the biconical bushing. Each of these two sleeves has a flange and a radial slit therein. A pulley is provided between the flanges of the sleeves, and this pulley engages the sleeves. Bolt means which extend through openings in the flanges of the sleeves and the pulley hold the pulley mounting together.

In order to allow easy dismounting of the pulley assembly, the following structure is provided. The biconical bushing has an annular groove along its periphery. A metal ring which projects from this groove is arranged therein. Adjacent the metal ring on either side thereof, elastic collars are provided which engage the inner ends of the sleeves. When the bolt means holding the pulley mounting together are loosened, the elastic collars expand and separate the parts of the mounting for easy disassembling.

Other objects and advantages of this invention will become apparent upon reference to the accompanying description when taken in conjunction with the following drawings in which like numerals refer to like parts throughout the several figures.

FIGURE 1 is a vertical section, in lengthwise direction, of a pulley hub provided with the improved mounting system.

FIGURE 2 is a vertical section according to the plane of symmetry in radial direction along the line II—II on FIGURE 1.

FIGURES 3, 4 and 5 represent different possible shapes of the outside periphery of the pulley.

Referring to the above figures, 1 represents the pulley, the outside peripheral face 2 of which can be given the desired shape to comply with the operating requirements of the pulley. The inside bore of pulley 1 has a cylindrical face 3. The cylindrical face 3 is brought into contact with the correspondingly cylindrical outside faces 6a of the sleeves 6 of pulley 1. The flanges 5 of the sleeve 6 are radially slit at 5a in order to create a circumferential clearance which gives an increased diameter to the flanges 5 and thus brings their face on the cylindrical face 3 of pulley 1. These flanges 5 are connected by bolts 9 with screwing head 10 passing through holes 1-a in the hub of pulley 1.

For that purpose, on one side, the shanks of bolts 9 pass through the holes 7 of one of the flanges 5, while in the other flange 5 on the opposite side of pulley 1, the threaded ends 11 of bolts 9 fit into the correspondingly internally threaded holes 8 of flange 5.

On the shaft 19 is arranged a biconical bushing 12 having an annular groove 15 extending radially along the periphery thereof and being centrally located. The bushing 12 is held by a key 14 partially inserted into the keyway 13 cut in the shaft 19 and partially into the space formed by the groove 15.

The conical inside peripheral faces 6b of the bore of the sleeves 6 come into contact with the conical outside peripheral face 16 of bushing 12.

In the circumferential groove 15 which is radially arranged in the plane of symmetry of bushing 12 there is inserted a metal ring 17 opened at 18 and forming a clip. On both sides of this ring 17 its radial faces 17a are in contact with the radial face opposite the elastic collars 20 of appropriate width, the opposite radial face of which is to come into contact with the matching face 6c opposite the ends of the sleeves 6 of flanges 5. Consequently when the flanges 5 come closer to one another due to the tightening of bolts 9, the elastic collars 20 are compressed and therefore deformed, and then appear as shown in FIGURE 1. The purpose of this provision is to cause, as the bolts 9 are unscrewed, the immediate release of flanges 5 and, as a result, the easy disassembling of the components of the mounting assembly without using tools. The radial annular faces of the collars 20 are plane or, if desired, indented.

The periphery 2 of pulley 1 can be plane (as shown in FIGURE 1) or lightly convex. The periphery 2a shown in FIGURE 3 is provided with edges. The periphery shown in FIGURE 4 is provided with teeth 2b or provided with a groove 2c as illustrated in FIGURE 5.

From the description set forth hereabove and the accompanying drawings, any craftsman will easily understand without further comments how to assemble and disassemble the mounting mechanism.

According to the diameter and the operating requirements of the pulley, the number of staybolts 9 as well as the size, nature and taper of the components of the system will vary.

It will be understood that this invention is susceptible to modification in order to adapt it to different usages and conditions, and, accordingly, it is desired to comprehend such modifications within this invention as may fall within the scope of the appended claims.

What I claim is:

1. A pulley mounting comprising in combination a shaft having a keyway, a biconical bushing mounted on said shaft, a key partially inserted in the keyway in said shaft and partially inserted in a longitudinal opening of said bushing, thereby attaching said bushing to said shaft, a pair of sleeves having a flange and a radial slit each, said sleeves engaging said biconical bushing and having screw holes in their flanges, a pulley inserted between said flanges of said sleeves and engaging said sleeves, said pulley having apertures at the height of said screw holes in the flanges of said sleeves and bolts extending through said holes and through said apertures thereby firmly interconnecting said pulley and said sleeves.

2. A pulley mounting as described in claim 1, further comprising an annular groove in said bushing along its periphery, a metal ring engaging the annular groove in said bushing, and a pair of elastic collars adjacent said metal ring on either side thereof, said elastic collars engaging with their outer ends the inner ends of said sleeves, thereby allowing to be compressed upon tightening of said bolts.

References Cited in the file of this patent

UNITED STATES PATENTS

| | | |
|---|---|---|
| 234,343 | Stedman | Nov. 9, 1880 |
| 318,975 | Gee | June 2, 1885 |